(12) United States Patent
Al Khunaizi et al.

(10) Patent No.: US 10,663,988 B2
(45) Date of Patent: May 26, 2020

(54) HIGH INTEGRITY PROTECTION SYSTEM FOR HYDROCARBON FLOW LINES

(71) Applicant: Saudi Arabian Oil Company, Dhahran (SA)

(72) Inventors: Mohammad R. Al Khunaizi, Dammam (SA); Rashid D. Al Hajri, Abqaiq (SA); Anthony E. Kakpovbia, Dhahran (SA); Fahad A. Al-Hindas, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 109 days.

(21) Appl. No.: 15/935,321

(22) Filed: Mar. 26, 2018

(65) Prior Publication Data

US 2019/0294184 A1 Sep. 26, 2019

(51) Int. Cl.
*G05D 16/20* (2006.01)
*F16K 37/00* (2006.01)
(Continued)

(52) U.S. Cl.
CPC ....... *G05D 16/2033* (2013.01); *E21B 34/102* (2013.01); *F16K 37/0091* (2013.01); *F17D 1/20* (2013.01); *G01M 3/2815* (2013.01); *G01M 3/2876* (2013.01); *G05D 16/204* (2013.01); *G05D 16/2073* (2013.01);
(Continued)

(58) Field of Classification Search
CPC ............. G05D 16/2033; G05D 16/204; G05D 16/2073; G05D 16/2006; G05D 16/2013; G05D 16/2026; G05D 16/2066; G01M 3/2815; G01M 3/2846; G01M 3/2876; G01M 13/003; F16K 37/0091; Y10T 137/0379; Y10T 137/0396; Y10T 137/86002; Y10T 137/8326
See application file for complete search history.

(56) References Cited

U.S. PATENT DOCUMENTS 4,319,603 A 3/1982 Snyder
4,840,057 A 6/1989 Bingham
(Continued)

FOREIGN PATENT DOCUMENTS

EP 2217984 8/2010
EP 2592318 5/2013
(Continued)

OTHER PUBLICATIONS

Onshus and Lund, "OTC 7828: HIPPS Applications and Acceptance Criteria," presented at the 27th Annual OTC, May 1-4, 1995, 6 pages.
(Continued)

*Primary Examiner* — Hailey K. Do
(74) *Attorney, Agent, or Firm* — Fish & Richardson P.C.

(57) ABSTRACT

A high integrity protection system includes a flow line including an inlet configured to be connected to a first source of pressure and an outlet configured to be connected to a downstream system. A first subsystem is installed on the flow line between the inlet and the outlet. A second subsystem is installed on the flow line between the inlet and the outlet, and the second subsystem is in a parallel flow configuration in relation to the first subsystem. The system includes a second source of pressure configured to be fluidically connected to the first subsystem and the second subsystem.

13 Claims, 8 Drawing Sheets

(51) Int. Cl.
    *G01M 3/28*     (2006.01)
    *F17D 1/20*     (2006.01)
    *E21B 34/10*     (2006.01)
    *E21B 34/02*     (2006.01)

(52) U.S. Cl.
    CPC .... *Y10T 137/0379* (2015.04); *Y10T 137/0396* (2015.04); *Y10T 137/8326* (2015.04)

(56) References Cited

U.S. PATENT DOCUMENTS

| | | | |
|---|---|---|---|
| 4,852,387 | A | 8/1989 | Bingham |
| 5,850,037 | A | 12/1998 | Mullins |
| 6,880,567 | B2 | 4/2005 | Klaver et al. |
| 6,968,851 | B2 | 11/2005 | Ramirez et al. |
| 7,823,640 | B2 | 11/2010 | Flanders |
| 7,905,251 | B2 | 3/2011 | Flanders |
| 8,161,993 | B2 | 4/2012 | Ratcliffe |
| 8,201,624 | B2 | 6/2012 | Flanders |
| 8,322,427 | B2 | 12/2012 | Indetherg et al. |
| 8,327,874 | B2 | 12/2012 | Flanders |
| 8,499,610 | B2 | 8/2013 | Oh et al. |
| 8,725,434 | B2 | 5/2014 | Flanders |
| 2005/0199286 | A1 | 9/2005 | Appleford |
| 2011/0056572 | A1 | 3/2011 | Flanders |
| 2011/0133942 | A1 | 6/2011 | Flanders |
| 2011/0144946 | A1 | 6/2011 | Flanders |
| 2013/0153041 | A1 | 6/2013 | Kucera |
| 2016/0201838 | A1 | 7/2016 | Flanders et al. |
| 2017/0328827 | A1 | 11/2017 | Mujica |
| 2019/0219230 | A1 | 7/2019 | Simon |

FOREIGN PATENT DOCUMENTS

| | | |
|---|---|---|
| GB | 2547675 | 8/2017 |
| WO | 2012054295 | 4/2012 |
| WO | 2017058262 | 4/2017 |

OTHER PUBLICATIONS

International Search Report and Written Opinion issued in International Application No. PCT/US2019/022775 dated Jun. 19, 2019, 13 pages.

International Search Report and Written Opinion issued in International Application No. PCT/US2019/022766 dated Jun. 17, 2019, 14 pages.

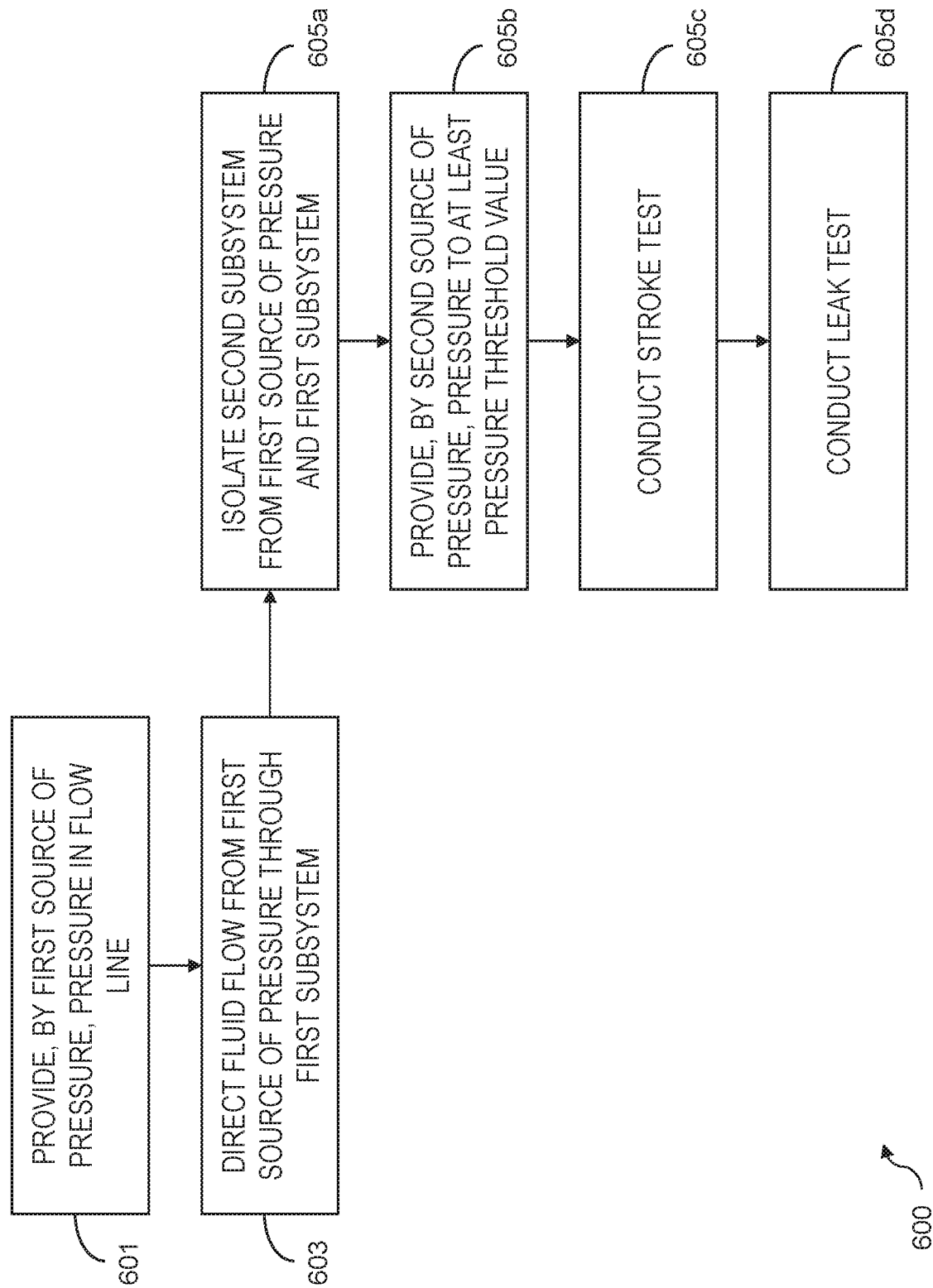

HIGH INTEGRITY PROTECTION SYSTEM FOR HYDROCARBON FLOW LINES

TECHNICAL FIELD

This specification relates to a high integrity protection system (HIPS) and testing of the same, implemented, for example, in hydrocarbon flow lines.

BACKGROUND

In the oil and gas industry, an overpressure event can cause damage to the environment, infrastructure, and personnel. Mitigating the risk of overpressure on hydrocarbon-producing wells and flow lines is a challenge that can be met with a high integrity protection system (HIPS). A HIPS is a safety instrumented system that is designed to prevent over-pressurization of a piping system or an operating plant, such as a chemical plant or oil refinery. The HIPS can be designed to shut off or isolate the source of pressure before the design pressure of the system is exceeded, thereby preventing loss of containment through rupture of a line or vessel. A HIPS can be considered as a barrier between a high-pressure and a low-pressure section of an installation.

SUMMARY

The present disclosure describes technologies relating to a high integrity protection system (HIPS) for hydrocarbon flow lines.

Certain aspects of the subject matter described here can be implemented as a HIPS. The HIPS includes a flow line including an inlet configured to be connected to a first source of pressure and an outlet configured to be connected to a downstream system. The downstream system is configured to withstand pressure up to a predetermined pressure threshold value. The HIPS includes a first subsystem installed on the flow line between the inlet and the outlet, and the first subsystem is configured to protect the downstream system by isolating the flow line from the downstream system when pressure within the first subsystem is equal to or greater than the predetermined pressure threshold value. The HIPS includes a second subsystem installed on the flow line between the inlet and the outlet, and the second subsystem is in a parallel flow configuration in relation to the first subsystem. The second subsystem is configured to protect the downstream system by isolating the flow line from the downstream system when pressure within the second subsystem is equal to or greater than the predetermined pressure threshold value. The HIPS includes a second source of pressure configured to be fluidically connected to the first subsystem and the second subsystem. While the first source of pressure provides fluidic pressure to the first subsystem, the second subsystem is configured to be isolated from the flow line and the first subsystem. While the first source of pressure provides fluidic pressure to the first subsystem, the second source of pressure is configured to provide fluidic pressure to the second subsystem to test a fluidic integrity of the second subsystem. While the first source of pressure provides fluidic pressure to the first subsystem, the second source of pressure is configured to be isolated from the first subsystem. While the first source of pressure provides fluidic pressure to the second subsystem, the first subsystem is configured to be isolated from the flow line and the second subsystem. While the first source of pressure provides fluidic pressure to the second subsystem, the second source of pressure is configured to provide fluidic pressure to the first subsystem to test a fluidic integrity of the first subsystem. While the first source of pressure provides fluidic pressure to the second subsystem, the second source of pressure is configured to be isolated from the second subsystem.

This, and other aspects, can include one or more of the following features. The first subsystem can include a first surface safety valve (SSV), a second SSV installed downstream of the first SSV, a set of pressure sensors installed upstream of the first SSV, and a logic solving processor in communication with the set of pressure sensors, the first SSV, and the second SSV. The logic solving processor can be configured to perform operations including transmitting signals to control the first SSV and the second SSV based on signals received from the set of pressure sensors.

The set of pressure sensors can be a first set of pressure sensors. The logic solving processor can be a first logic solving processor. The second subsystem can include a third SSV, a fourth SSV installed downstream of the third SSV, a second set of pressure sensors installed upstream of the third SSV, and a second logic solving processor in communication with the second set of pressure sensors, the third SSV, and the fourth SSV. The second logic solving processor can be configured to perform operations including transmitting signals to control the third SSV and the fourth SSV based on signals received from the second set of pressure sensors.

The first source of pressure can include a hydrocarbon-carrying pipeline.

The second source of pressure can include a pump or a compressor, and the second source of pressure can be configured to provide fluidic pressure in the flow line to at least the predetermined pressure threshold value.

The first logic solving processor can be configured to perform operations including, while the second source of pressure provides fluidic pressure to the first subsystem, executing a stroke test on the first SSV and the second SSV and executing a leak test on the first SSV and the second SSV The second logic solving processor can be configured to perform operations including, while the second source of pressure provides fluidic pressure to the second subsystem, executing a stroke test on the third SSV and the fourth SSV and executing a leak test on the third SSV and the fourth SSV.

The first subsystem can include a first leak sensor installed between the first SSV and the second SSV. The first subsystem can include a second leak sensor installed downstream of the second SSV. The first logic solving processor can be in communication with the first leak sensor and the second leak sensor. The first logic solving processor can be configured to perform operations including transmitting a first leak failure signal based on determining a presence of a leak past any one of the first SSV and the second SSV, while the first SSV and the second SSV are closed.

The second subsystem can include a third leak sensor installed between the third SSV and the fourth SSV. The second subsystem can include a fourth leak sensor installed downstream of the fourth SSV. The second logic solving processor can be in communication with the third leak sensor and the fourth leak sensor. The second logic solving processor can be configured to perform operations including transmitting a second leak failure signal based on determining a presence of a leak past any one of the third SSV and the fourth SSV, while the third SSV and the fourth SSV are closed.

The first logic solving processor can include a hardware processor and a computer-readable storage medium coupled to the hardware processor. The computer-readable storage medium can store programming instructions for execution by the hardware processor. The programming instructions, when executed, cause the hardware processor to perform operations including transmitting a close signal to close the first SSV and the second SSV based on determining any two of the first set of pressure sensors senses in the flow line a pressure equal to or greater than the predetermined pressure threshold value. The programming instructions, when executed, cause the hardware processor to perform operations including transmitting a closure failure signal based on determining that any one of the first SSV and the second SSV failed to close upon transmission of the close signal.

The hardware processor can be a first hardware processor, and the computer-readable storage medium can be a first computer-readable storage medium. The close signal can be a first close signal, and the closure failure signal can be a first closure failure signal. The second logic solving processor can include a second hardware processor and a second computer-readable storage medium coupled to the second hardware processor. The second computer-readable storage medium can store programming instructions for execution by the second hardware processor. The programming instructions, when executed, cause the second hardware processor to perform operations including transmitting a second close signal to close the third SSV and the fourth SSV based on determining any two of the second set of pressure sensors senses in the flow line a pressure equal to or greater than the predetermined pressure threshold value. The programming instructions, when executed, cause the second hardware processor to perform operations including transmitting a second closure failure signal based on determining that any one of the third SSV and the fourth SSV failed to close upon transmission of the close signal.

The first leak sensor, the second leak sensor, the third leak sensor, and the fourth leak sensor can be pressure sensors.

While the first SSV is closed, if an increase in fluidic pressure that is equal to or greater than a predetermined pressure differential threshold value is detected by the first leak sensor within a predetermined time span after closing of the first SSV, a presence of a leak past the first SSV can be determined. While the second SSV is closed, if an increase in fluidic pressure that is equal to or greater than the predetermined pressure differential threshold value is detected by the second leak sensor within the predetermined time span after closing of the second SSV, a presence of a leak past the second SSV can be determined. While the third SSV is closed, if an increase in fluidic pressure that is equal to or greater than the predetermined pressure differential threshold value is detected by the third leak sensor within the predetermined time span after closing of the third SSV, a presence of a leak past the third SSV can be determined. While the fourth SSV is closed, if an increase in fluidic pressure that is equal to or greater than the predetermined pressure differential threshold value is detected by the fourth leak sensor within the predetermined time span after closing of the fourth SSV, a presence of a leak past the fourth SSV can be determined.

Certain aspects of the subject matter described here can be implemented as a method for safety testing of a HIPS. A flow line including a first subsystem and a second subsystem in a parallel flow configuration in relation to each other. Fluidic pressure in the flow line is provided by a first source of pressure. Fluid flow is directed from the first source of pressure through the first subsystem. While directing fluid flow through the first subsystem, the second subsystem is isolated from the first source of pressure and the first subsystem. While directing fluid flow through the first subsystem, fluidic pressure is provided in the second subsystem by a second source of pressure to at least a predetermined pressure threshold value. While directing fluid flow through the first subsystem, a stroke test is conducted on the second subsystem. While directing fluid flow through the first subsystem, a leak test is conducted on the second subsystem.

Fluid flow can be directed from the first source of pressure through the second subsystem. While directing fluid flow through the second subsystem, the first subsystem can be isolated from the first source of pressure and the second subsystem. While directing fluid flow through the second subsystem, fluidic pressure can be provided in the first subsystem by the second source of pressure to at least the predetermined pressure threshold value. While directing fluid flow through the second subsystem, a stroke test can be conducted on the first subsystem. While directing fluid flow through the second subsystem, a leak test can be conducted on the first subsystem.

The first subsystem can include a first SSV, a second SSV installed downstream of the first SSV, a first set of pressure sensors installed upstream of the first SSV, and a first logic solving processor in communication with the first set of pressure sensors, the first SSV, and the second SSV. The first logic solving processor can be configured to perform operations including transmitting signals to control the first SSV and the second SSV based on signals received from the first set of pressure sensors. The second subsystem can include a third SSV, a fourth SSV installed downstream of the third SSV, a second set of pressure sensors installed upstream of the third SSV, and a second logic solving processor in communication with the second set of pressure sensors, the third SSV, and the fourth SSV. The second logic solving processor can be configured to perform operations including transmitting signals to control the third SSV and the fourth SSV based on signals received from the second set of pressure sensors.

Conducting the stroke test on the first subsystem can include transmitting a first close signal to close the first SSV and the second SSV based on detecting pressure in the first subsystem equal to or greater than the predetermined pressure threshold value. Conducting the stroke test on the first subsystem can include actuating a first close failure alarm based on determining that any one of the first SSV and the second SSV failed to close upon transmission of the first close signal. Conducting the stroke test on the second subsystem can include transmitting a second close signal to close the third SSV and the fourth SSV based on detecting pressure in the second subsystem equal to or greater than the predetermined pressure threshold value. Conducting the stroke test on the second subsystem can include actuating a second close failure alarm based on determining that any one of the third SSV and the fourth SSV failed to close upon transmission of the second close signal.

Conducting the leak test on the first subsystem can include detecting a first change in fluidic pressure directly downstream of the first SSV by a first leak sensor installed directly downstream of the first SSV. Conducting the leak test on the first subsystem can include detecting a second change in fluidic pressure directly downstream of the second SSV by a second leak sensor installed directly downstream of the second SSV. Conducting the leak test on the first subsystem can include comparing the first change in fluidic pressure to a predetermined pressure differential threshold value by the first logic solving processor. Conducting the leak test on the first subsystem can include comparing the second change in fluidic pressure to a predetermined pressure differential threshold value by the first logic solving processor. Conducting the leak test on the first subsystem can include actuating a first leak failure alarm if the first change in fluidic pressure is greater than the predetermined pressure differential threshold value within a predetermined time span after the transmission of the first close signal. Conducting the leak test on the first subsystem can include actuating a second leak failure alarm if the second change in fluidic pressure is greater than the predetermined pressure differential threshold value within the predetermined time span after the transmission of the first close signal.

Conducting the leak test on the second subsystem can include detecting a third change in fluidic pressure directly downstream of the third SSV by a third leak sensor installed directly downstream of the third SSV. Conducting the leak test on the second subsystem can include detecting a fourth change in fluidic pressure directly downstream of the fourth SSV by a fourth leak sensor installed directly downstream of the fourth SSV. Conducting the leak test on the second subsystem can include comparing the third change in fluidic pressure to the predetermined pressure differential threshold value by the second logic solving processor. Conducting the leak test on the second subsystem can include comparing the fourth change in fluidic pressure to a predetermined pressure differential threshold value by the second logic solving processor. Conducting the leak test on the second subsystem can include actuating a third leak failure alarm if the third change in fluidic pressure is greater than the predetermined pressure differential threshold value within the predetermined time span after the transmission of the second close signal. Conducting the leak test on the second subsystem can include actuating a fourth leak failure alarm if the fourth change in fluidic pressure is greater than the predetermined pressure differential threshold value within the predetermined time span after the transmission of the second close signal.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 6 shows a flow chart illustrating an example method for safety testing of a HIPS.

DETAILED DESCRIPTION

Figure 1:
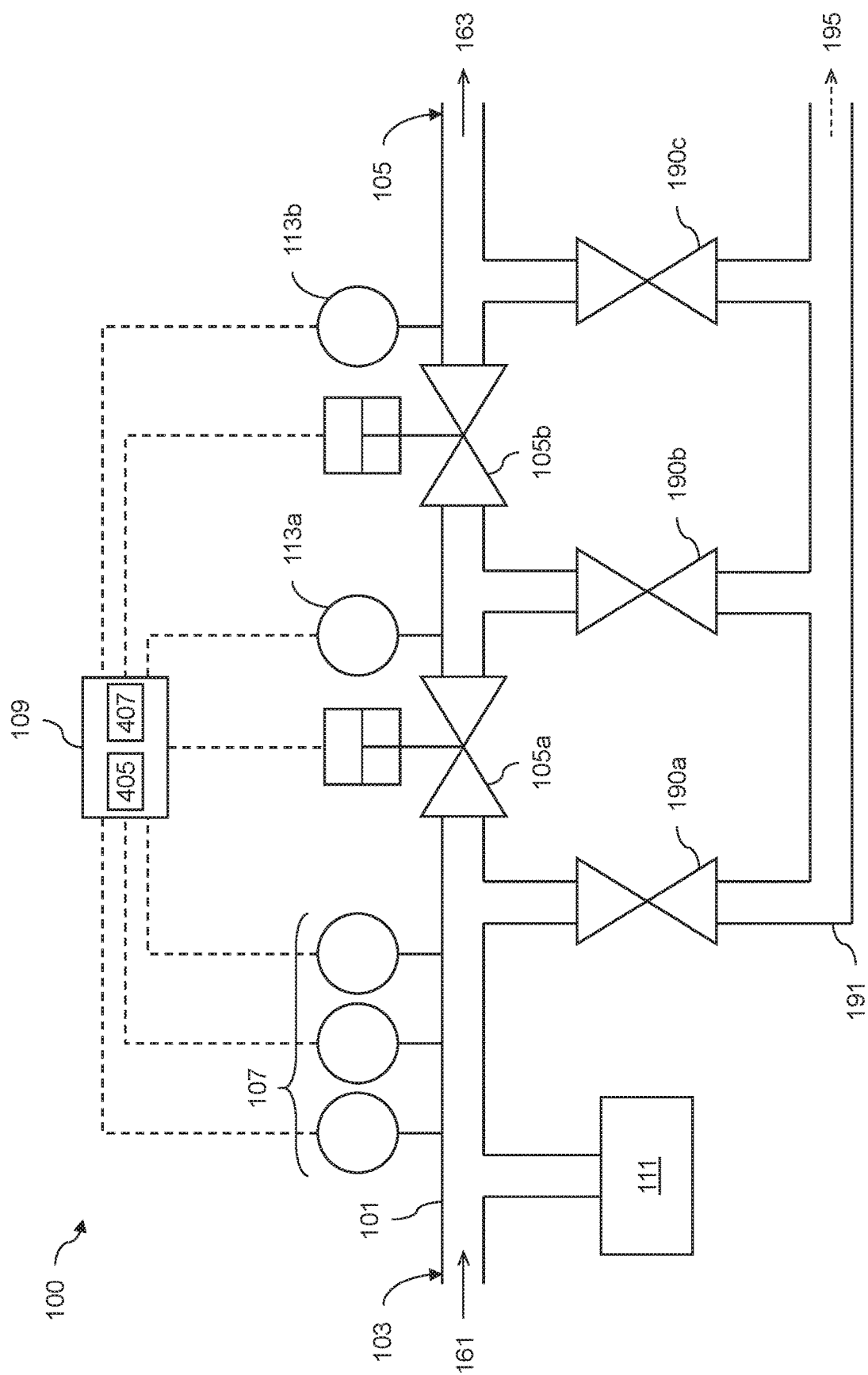
FIG. 1 is an example of a high integrity protection system (HIPS).

In the oil and gas industry, production fluid flow lines downstream of a wellhead are typically thin-walled in order to minimize the cost of the flow line. Such flow lines should be protected against overpressure, which can rupture the flow line and can result in loss of containment (release of product to the environment), expensive repair, and pause in production. One example of a system used to protect flow lines from overpressure is the high integrity protection system (HIPS). HIPS typically includes a pressure sensor, a safety surface valve (SSV), and a logic solving processor. The safety of the HIPS is tested regularly, since a malfunction in operation of the HIPS presents the risk of damage to the flow line. Typically, in order to test the safety of the HIPS, an overpressure event is simulated to verify that the HIPS is operating correctly to protect the flow line. A simulated overpressure event can include sending a pressure signal (downstream of the pressure sensor) to the logic solving processor that corresponds to a high pressure that meets or exceeds a pressure threshold value. In response, the logic solving processor can send a signal to close the SSV in order to isolate the flow line from the source of high pressure. If, for any reason, the SSV does not close after the logic solving processor has sent the signal to close the SSV, then the logic solving processor can actuate a failure alarm to notify an operator of the malfunction.

Actual testing of the HIPS, where controlled, fluidic pressure (in contrast to a simulated pressure signal) is provided to the HIPS, can allow functionality testing of the pressure sensors of the HIPS and also allow examination of the integrated response of the HIPS. Actual testing of the HIPS can test the capability and the SSVs of the HIPS to fully close at the pressure threshold value (or at pressures higher than the pressure threshold value). The testing at increased pressure can reveal how the instruments of the HIPS (for example, the SSVs and the pressure sensors) would actually react in an overpressure event. With actual testing of the HIPS, seat leakage testing of the SSVs of the HIPS can also be performed. Seat leakage testing can be performed to verify the integrity of the SSVs and is another layer of testing that can ensure safety of not only the system, but also the personnel operating the system.

The subject matter described in this disclosure can be implemented in particular implementations, so as to realize one or more of the following advantages. The HIPS can be tested with an actual fluidic pressure (in contrast to a simulated overpressure) to verify that the HIPS would operate correctly in an actual overpressure event. The actual fluidic pressure can better mimic actual HIPS performance during an overpressure event in comparison to a simulated overpressure event. A valve stroke test can be performed on the HIPS with actual fluidic pressure to verify that the valves of the HIPS would close correctly in an overpressure event. A valve leak test can be performed on the HIPS with actual fluidic pressure to verify that the valves of the HIPS do not leak (that is, let fluid flow through) when they are closed. The valve leak test can be performed simultaneously with the valve stroke test. The valve stroke test and the valve leak test can be performed simultaneously on the HIPS.

FIG. 1 depicts an example high integrity protection system (HIPS) 100. The HIPS 100 includes a flow line 101, a first surface safety valve (SSV) 105a, a second SSV 105b, multiple pressure sensors 107, a logic solving processor 109, and a second source of pressure 111. The flow line 101 includes an inlet 103 to be connected to a first source of pressure 161. The first source of pressure can be a hydrocarbon-carrying pipeline, such as a wellhead pipeline or a pipeline carrying hydrocarbons across hundreds of miles. The inlet 103 can include a valve (not shown) that can be closed to isolate the flow line 101 from the first source of pressure 161. The flow line 101 includes an outlet 105 to be connected to a downstream system 163. The downstream system 163 can withstand pressure up to a predetermined pressure threshold value. The predetermined pressure threshold value can be, for example, the design pressure or maximum allowable pressure rating of the downstream system 163. The downstream system 163 can include, for example, a pipeline, a piping network of hydrocarbon end users, or a hydrocarbon refining unit. The outlet 105 can include a valve (not shown) that can be closed to isolate the flow line 101 from the downstream system 163. The first SSV 105a is installed on the flow line 101 between the inlet 103 and the outlet 105. The second SSV 105b is installed on the flow line 101 between the first SSV 105a and the outlet 105, that is, downstream of the first SSV 105a and upstream of the outlet 105. The pressure sensors 107 are installed on the flow line 101 between the inlet 103 and the first SSV 105a. In some cases, the pressure sensors 107 are installed on the flow line 101 downstream of the second SSV 105b. The logic solving processor 109 is in communication with the pressure sensors 107, the first SSV 105a, and the second SSV 105b. For example, the logic solving processor 109 can be connected to the first SSV 105a and the second SSV 105b with a hard-wired connection, or the logic solving processor 109 can communicate with the first SSV 105a and the second SSV 105b with wireless transmitters. Similarly, the logic solving processor 109 can be connected to the pressure sensors 107 with a hard-wired connection, or the logic solving processor 109 can communicate with the pressure sensors 107 with wireless transmitters. The second source of pressure 111 can be fluidically connected to the flow line 101 between the inlet 103 and the first SSV 105a. In some cases, the second source of pressure 111 is fluidically connected to the flow line 101 downstream of the second SSV 105b. The second source of pressure 111 can include a pump, a compressor or any machine or device that can generate a positive pressure. The HIPS 100 is provided with standardized flanges and is integrally constructed.

A SSV is a hydraulically actuated fail-safe valve on flow lines and can be used to isolate a source of pressure from any downstream systems. "Fail-safe" means the failure position (that is, position when the valve fails) of the valve is the position that mitigates the risk of overpressure. For example, if the SSV is located downstream of the source of pressure and upstream of the system that is being protected, the fail-safe position can be fail-close, thereby isolating the protected system from the source of pressure. The SSV can be closed to prevent pressure from rising above a pressure threshold, thereby protecting downstream systems from over-pressurization. In some cases, the closing of the SSV is accompanied with turning off the source of pressure as an additional measure to mitigate the risk of overpressure. During testing of the SSV, an overpressure event may be emulated (that is, the pressure is increased at least to the pressure threshold) to verify that the SSV is operating correctly (that is, closing at the initiating event of reaching the pressure threshold). Although the HIPS 100 shown in FIG. 1 includes two SSVs, the HIPS 100 can include one SSV or additional SSVs. SSVs are isolation valves that can be, for example, gate valves or ball valves.

Under normal operation, the first source of pressure 161 sends fluid through the flow line 101 to the downstream system 163. The first source of pressure 161 can be, for example, a well. The well enables access to one or more subterranean zones to allow recovery (that is, production) of fluid to the surface. As another example, the first source of pressure 161 can be a pipeline carrying hydrocarbons across hundreds of miles. The fluid flowing through the flow line 101 can be a hydrocarbon gas, a hydrocarbon liquid, or a mixture of both. In some cases, the fluid flowing through the flow line 101 is another fluid, such as primarily water in vapor, liquid, or mixed phase.

During testing of the HIPS 100, the flow line can be isolated from the first source of pressure 161 (that is, the first source of pressure 161 ceases to provide fluid pressure to the HIPS 100) and the downstream system 163. The second source of pressure 111 can provide fluidic pressure to the flow line 101 to test the fluidic integrity of the HIPS. The second source of pressure 11 can provide fluidic pressure in the flow line 101 to at least the predetermined pressure threshold value. In some cases, the second source of pressure 111 is permanently connected to the flow line 101; for example, the second source of pressure 111 is connected to the flow line 101 with piping. In some cases, the second source of pressure 111 is temporarily connected to the flow line 101; for example, the second source of pressure 111 is not normally connected to the flow line 101 with piping, but can be connected for testing of the HIPS 100 with temporary piping or tubing. In some cases, the second source of pressure 111 is a designated piece of equipment for testing of the HIPS 100. In some cases, the second source of pressure 111 can be used to provide pressure for another system and can be temporarily connected with the flow line 101 for the purpose of testing the HIPS 100. In some cases, the second source of pressure 111 is in communication with the logic solving processor 107 and can be controlled by the logic solving processor 107. For example, the logic solving processor 107 can send a signal to turn on the second source of pressure 111 for testing of the HIPS 100 and can send a signal to turn off the second source of pressure 111 after testing of the HIPS 100 is complete. The pressure provided by the second source of pressure 111 can be modulated, for example, by a control valve. The control valve can be a manual valve or an automatic valve controlled by, for example, the logic solving processor 107 to provide a desired level of pressure to the flow line 101 during testing of the HIPS 100. After testing, the flow line 101 can be disconnected or isolated from the second source of pressure 111 and reconnected to the first source of pressure 161 and the downstream system 163.

The HIPS 100 can include discharge valves (190a, 190b, 190c) between the inlet 103 and the first SSV 105a, between the first SSV 105a and the second SSV 105b, and between the second SSV 105b and the outlet 105, respectively. Under normal operation, these discharge valves 190a, 190b, and 190c are closed. The discharge valves 190a, 190b, and 190c can be opened to purge, drain, vent, or clear piping between respective components (for example, between the first SSV 105a and the second SSV 105b). The discharge valves 190a, 190b, and 190c can share a common discharge manifold 191 (as shown in FIG. 1) or can each have separate discharge piping to send fluid to another downstream system 195 (for example, a disposal system, flare, burn pit, or recirculation system). All valves (including the first SSV 105a and the second SSV 105b) can be operated by conventional hydraulically or electrically-powered valve actuators (not shown), such as those that are well known in the art. The discharge valves 190a, 190b, and 190c can be controlled automatically (for example, with the logic solving processor 109a or a control system) or manually (for example, by an operator).

The pressure sensors 107 can be pressure transmitters that measure a pressure within the flow line 101 and transmit respective pressure signals to the logic solving processor 109. The pressure sensors 107 can optionally include local gauges. Although FIG. 1 shows three pressure sensors 107, the HIPS 100 can include additional or fewer pressure sensors. Additional pressure sensors located in the same vicinity (such as the pressure sensors 107) can be added for redundancy, increased overall system reliability, or as backups. The pressure sensors 107 can measure a pressure or a differential pressure across a section of piping.

Figure 4:
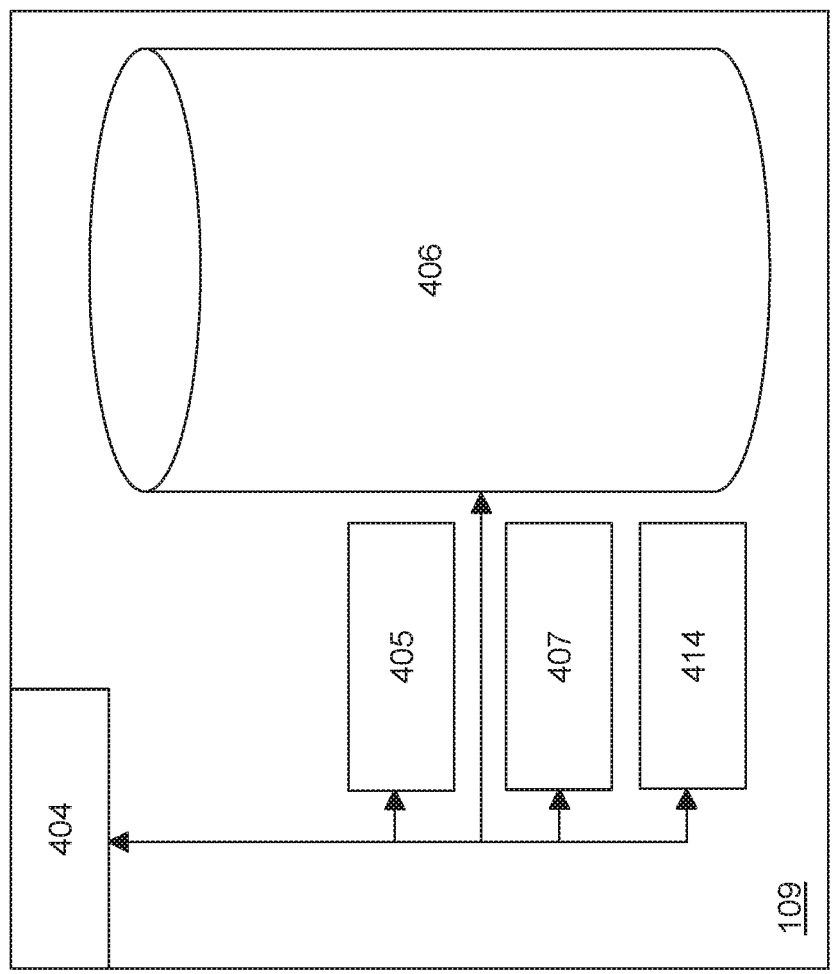
FIG. 4 is a block diagram of an example logic solving processor of the HIPS of FIG. 1.

As an example, the logic solving processor 109 can be a software module preprogrammed in a computer. The logic solving processor 109 can include at least one hardware processor 405 and a computer-readable storage medium 407 coupled to the at least one hardware processor. The storage medium 407 can store programming instructions for execution by the at least one hardware processor 405. The programming instructions, when executed, can cause the at least one hardware processor 405 to perform operations. The operations can include executing a stroke test and a leak test on the first SSV 105a and the second SSV 105b while the second source of pressure 111 provides fluidic pressure in the flow line 101. The operations include transmitting a close signal to close the first SSV 105a and the second SSV 105b based on determining that any two of the pressure sensors 107 senses in the flow line 101, a pressure that does not satisfy the predetermined pressure threshold value. For example, a close signal can be transmitted to close the first SSV 105a and the second SSV 105b based on determining that any two of the pressure sensors 107 senses in the flow line 101, a pressure that is equal to or greater than the predetermined pressure threshold value. The operations include transmitting a closure failure signal based on determining that any one of the SSVs (105a, 105b) failed to close upon transmission of the close signal. The logic solving processor 109 can execute a two-out-of-three (2oo3) voting configuration. In a 2oo3 voting configuration, the logic solving processor 109 receives three pressure signals from the respective pressure sensors 107, and if any two of the three pressure signals satisfies a trip condition (for example, exceeding the pressure threshold value), then the logic solving processor 109 executes an operation in response (for example, send a close signal to close the first SSV 105a and the second SSV 105b). The 2oo3 voting configurations allows the HIPS 100 to continue to protect the flow line 101 and the downstream system 163 even if one of the three pressure sensors 107 fails. Another voting configuration that is possible is a one-out-of-two (1oo2) voting configuration. In a 1oo2 voting configuration, the logic solving processor 109 receives two pressure signals from respective pressure sensors (such as two of the pressure sensors 107), and if any one of the two pressure signals satisfies a trip condition (for example, exceeding the pressure threshold value), then the logic solving processor 109 executes an operation in response (for example, send a close signal to close the first SSV 105a and the second SSV 105b). The logic solving processor 109 is also shown in FIG. 4 and described in more detail later.

The HIPS 100 can include a first leak sensor 113a installed on the flow line 101 between the first SSV 105a and the second SSV 105b, directly downstream of the first SSV 105a. The HIPS 100 can include a second leak sensor 113b installed on the flow line 101 between the second SSV 105b and the outlet 105, directly downstream of the second SSV 105b. The logic solving processor 109 can be in communication with the first leak sensor 113a and the second leak sensor 113b. The logic solving processor 109 can perform operations including transmitting a leak failure signal based on determining a presence of a leak past any one of the first SSV 105a and the second SSV 105b while the first SSV 105a and the second SSV 105b are closed. In some cases, the first leak sensor 113a and the second leak sensor 113b are pressure sensors, similar to or substantially the same as the pressure sensors 107. An increase in fluidic pressure detected by the first leak sensor 113a while the first SSV 105a is closed can indicate a presence of a leak past the first SSV 105a. An increase in fluidic pressure detected by the second leak sensor 113b while the second SSV 105b is closed can indicate a presence of a leak past the second SSV 105b.

Figure 2:
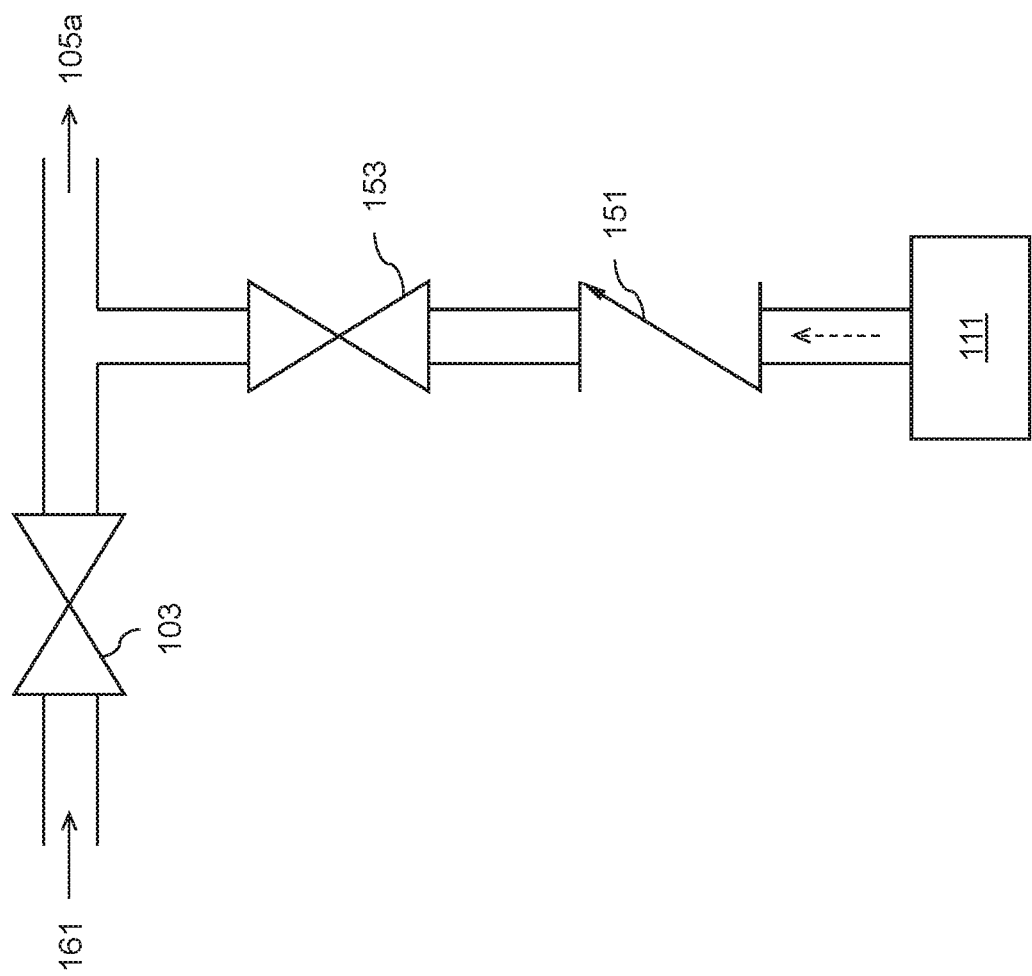
FIG. 2 is an enlarged view of a section of the HIPS of FIG. 1.

FIG. 2 illustrates another view of the HIPS 100 shown in FIG. 1. As mentioned previously, the inlet 103 connecting the first source of pressure 161 to the flow line 101 can include a valve. Although not shown in FIG. 2, the inlet 103 can include additional valves. For example, the inlet 103 can include a double block and bleed (that is, two block valves with a bleed valve in between). The inlet 103 can be closed (that is, the valve can be closed) to isolate the flow line 101 from the first source of pressure 161. In some cases (as shown in FIG. 2), the second source of pressure 111 is permanently connected to the flow line 101 with piping. Since the second source of pressure 111 is not the normal source of pressure to the flow line 101, a valve 153 can be closed to isolate the flow line 101 from the second source of pressure 111. A blind can optionally be installed to isolate the flow line 101 from the second source of pressure 111. Removing the blind or opening the valve 153 can allow fluid to flow from the second source of pressure 111 to the flow line 101. A backflow prevention device, such as a check valve 151, can be included to prevent fluid from flowing backward, that is, from the flow line 101 to the second source of pressure 111. In situations where the second source of pressure 111 is off (that is, not providing fluidic pressure), the backflow prevention device can help to protect the second source of pressure 111.

Figure 3:
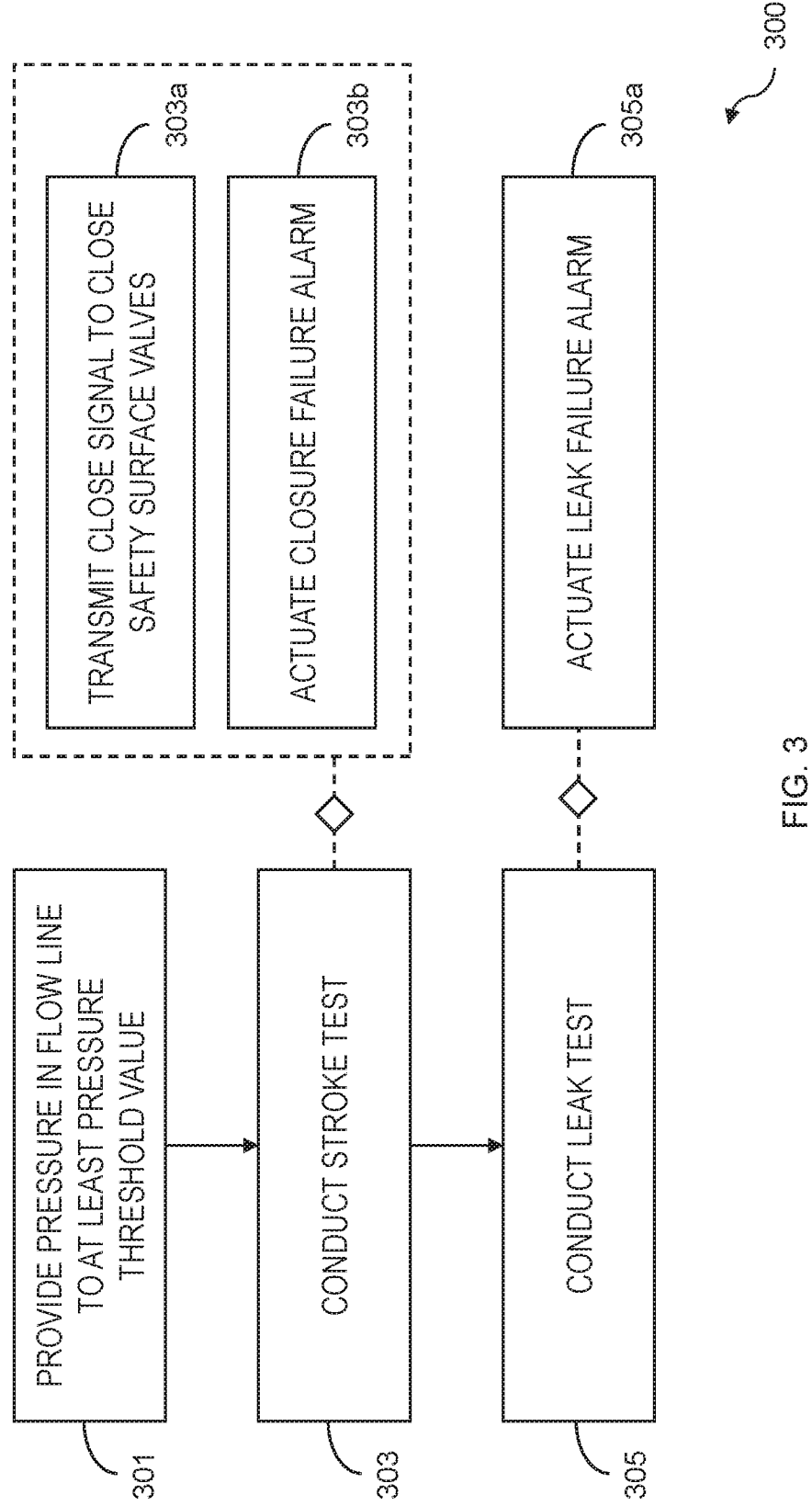
FIG. 3 is a flow chart of an example method for safety testing of a HIPS.

FIG. 3 is a flow chart illustrating a method 300 for safety testing of a HIPS, such as the HIPS 100, for a flow line connected to a first source of pressure and a downstream system. The first source of pressure can be a hydrocarbon-carrying pipeline, such as the wellhead pipeline 201. During safety testing, the flow line is isolated from the first source of pressure, for example, by closing a valve between the flow line and the first source of pressure. During safety testing, the flow line is isolated from the downstream system, for example, by closing a valve between the flow line and the downstream system. The discharge valves (190a, 190b, and 190c) can be opened, so that any contained fluid may be flushed or purged. At 301, fluidic pressure is provided in the flow line by a second source of pressure to at least a predetermined pressure threshold value. The predetermined pressure threshold value can be, for example, a maximum allowable pressure rating for the flow line or the downstream system. The second source of pressure (for example, the second source of pressure 111) provides fluidic pressure and can be a pump for liquid flow or a compressor for gas flow. The choice of pump or compressor as the second source of pressure can be decided based on whichever better mimics the normal fluid flow through the flow line. In some implementations, the second source of pressure is designated for safety testing of the HIPS and is permanently connected to the flow line (that is, the flow line and the second source of pressure are connected by piping or tubing, and fluid communication between the flow line and the second source of pressure is allowed by opening a valve or blind). In some implementations, the second source of pressure is temporarily connected to the flow line during safety testing of the HIPS. During safety testing of the HIPS, an overpressure event is emulated by increasing the pressure in the flow line to at least the predetermined pressure threshold value. The pressure is a fluidic pressure (that is, an actual force per unit area supplied by a fluid) in contrast to a simulated pressure (that is, a signal corresponding to a fluidic pressure).

At 303, a stroke test is conducted by a logic solving processor, such as the logic solving processor 109. The HIPS can include at least two SSVs (for example, the SSVs 105a and 105b). The stroke test is used to test the operation of the SSVs. The logic solving processor can receive multiple pressure signals from respective pressure sensors installed on the flow line upstream of the at least two SSVs (for example, the pressure sensors 107). The pressure signals correspond to a pressure within the flowline. In the case that there are three pressure sensors (as shown in FIG. 1), the logic solving processor can have a two-out-of-three (2oo3) voting configuration. In a 2oo3 voting configuration, if any two of the three pressure signals correspond to a pressure that is equal to or greater than the predetermined pressure threshold value, then a close signal is transmitted to the at least two SSVs to close the at least two SSVs. The logic solving processor can actuate a closure failure alarm if any one of the SSVs failed to close upon transmission of the close signal within a predetermined time span. For example, if an SSV (105a, 105b, or both) has not fully closed within 60 seconds of transmitting the close signal, a closure failure alarm can be actuated. In some cases, the closure failure alarm can correspond to or indicate the specific SSV that failed to close. The closure failure alarm can alert an operator that an SSV requires further diagnostics, repair, or replacement.

At 305, a leak test is conducted by the logic solving processor. The leak test is used to verify the shutoff capability of the SSVs. The HIPS can include a leak sensor directly downstream of each SSV (for example, the leak sensors 113a and 113b, directly downstream of SSV 105a and 105b, respectively). The leak sensors can be pressure sensors, similar or substantially the same as the pressure sensors 107. The leak sensors detect a fluidic pressure or any change in fluidic pressure directly downstream of each of the SSVs. A change in fluidic pressure can be compared to a predetermined pressure differential threshold value. If the leak sensors detect an increase in fluidic pressure that is equal to or larger than the predetermined pressure differential threshold value occurring within a predetermined time span (which can be the same or different from the predetermined time span in 303) after closing the SSVs, a presence of a leak past at least one of the SSVs has been determined. For example, if the pressure downstream of a closed SSV (105a or 105b) increases by at least 5 pounds per square inch (psi) within 15 minutes, a leak has been detected. A leak failure alarm can be actuated based on determining the presence of a leak. In some cases, the leak failure alarm can correspond to or indicate the specific SSV that is leaking. The leak failure alarm can alert an operator that an SSV requires further diagnostics, repair, or replacement. The stroke test (303) and the leak test (305) can occur simultaneously.

FIG. 4 is a block diagram of an example logic solving processor 109 (also shown in FIG. 1) used to provide computational functionalities associated with described algorithms, methods, functions, processes, flows, and procedures, as described in this specification, according to an implementation. The illustrated logic solving processor 109 is intended to encompass any computing device such as a server, desktop computer, laptop/notebook computer, one or more processors within these devices, or any other suitable processing device, including physical or virtual instances (or both) of the computing device. Additionally, the logic solving processor 109 can include (or communicate with) a computer that includes an input device, such as a keypad, keyboard, touch screen, or other device that can accept user information, and an output device that conveys information associated with the operation of the logic solving processor 109, including digital data, visual, audio information, or a combination of information.

The logic solving processor 109 includes a processor 405. Although illustrated as a single processor 405 in FIG. 4, two or more processors may be used according to particular needs, desires, or particular implementations of the logic solving processor 109. Generally, the processor 405 executes instructions and manipulates data to perform the operations of the logic solving processor 109 and any algorithms, methods, functions, processes, flows, and procedures as described in this specification.

The logic solving processor 109 can also include a database 406 that can hold data for the logic solving processor 109 or other components (or a combination of both) that can be connected to the network. Although illustrated as a single database 406 in FIG. 4, two or more databases (of the same or combination of types) can be used according to particular needs, desires, or particular implementations of the logic solving processor 109 and the described functionality. While database 406 is illustrated as an integral component of the logic solving processor 109, in alternative implementations, database 406 can be external to the logic solving processor 109. The database 406 can include various parameters, such as the predetermined pressure threshold value, the predetermined pressure differential threshold value, and the predetermined time span.

The logic solving processor 109 can include an interface 404. Although illustrated as a single interface 404 in FIG. 4, two or more interfaces 404 may be used according to particular needs, desires, or particular implementations of the logic solving processor 109. The interface 404 is used by the logic solving processor 109 for communicating with other systems that are connected to the network in a distributed environment. Generally, the interface 404 comprises logic encoded in software or hardware (or a combination of software and hardware) and is operable to communicate with the network. More specifically, the interface 404 may comprise software supporting one or more communication protocols associated with communications such that the network or interface's hardware is operable to communicate physical signals within and outside of the illustrated logic solving processor 109.

The logic solving processor 109 also includes a storage medium 407 (also referred as the memory) that can hold data for the logic solving processor 109 or other components (or a combination of both) that can be connected to the network. The memory 407 can be transitory or non-transitory. Although illustrated as a single memory 407 in FIG. 4, two or more memories 407 (of the same or combination of types) can be used according to particular needs, desires, or particular implementations of the logic solving processor 109 and the described functionality. While memory 407 is illustrated as an integral component of the logic solving processor 109, in alternative implementations, memory 407 can be external to the logic solving processor 109. The memory 407 stores computer-readable instructions executable by the processor 405 that, when executed, cause the one or more processors 405 to perform operations including transmitting signals to control valves, such as the first SSV 105a and the second SSV 105b shown in FIG. 1. Data can be obtained and stored (for example, during the stroke test 303 and the leak test 305 of method 300) in the memory 407. The data obtained can optionally be graphically represented, for example, using the interface 404.

The logic solving processor 109 can also include a power supply 414. The power supply 414 can include a rechargeable or non-rechargeable battery that can be configured to be either user- or non-user-replaceable. The power supply 414 can be hard-wired. There may be any number of logic solving processors 109 associated with, or external to, a computer system containing logic solving processor 109, each logic solving processor 109 communicating over the network.

Further, the term "client," "user," "operator," and other appropriate terminology may be used interchangeably, as appropriate, without departing from the scope of this specification. Moreover, this specification contemplates that many users may use one logic solving processor 109, or that one user may use multiple logic solving processors 109.

Figure 5:
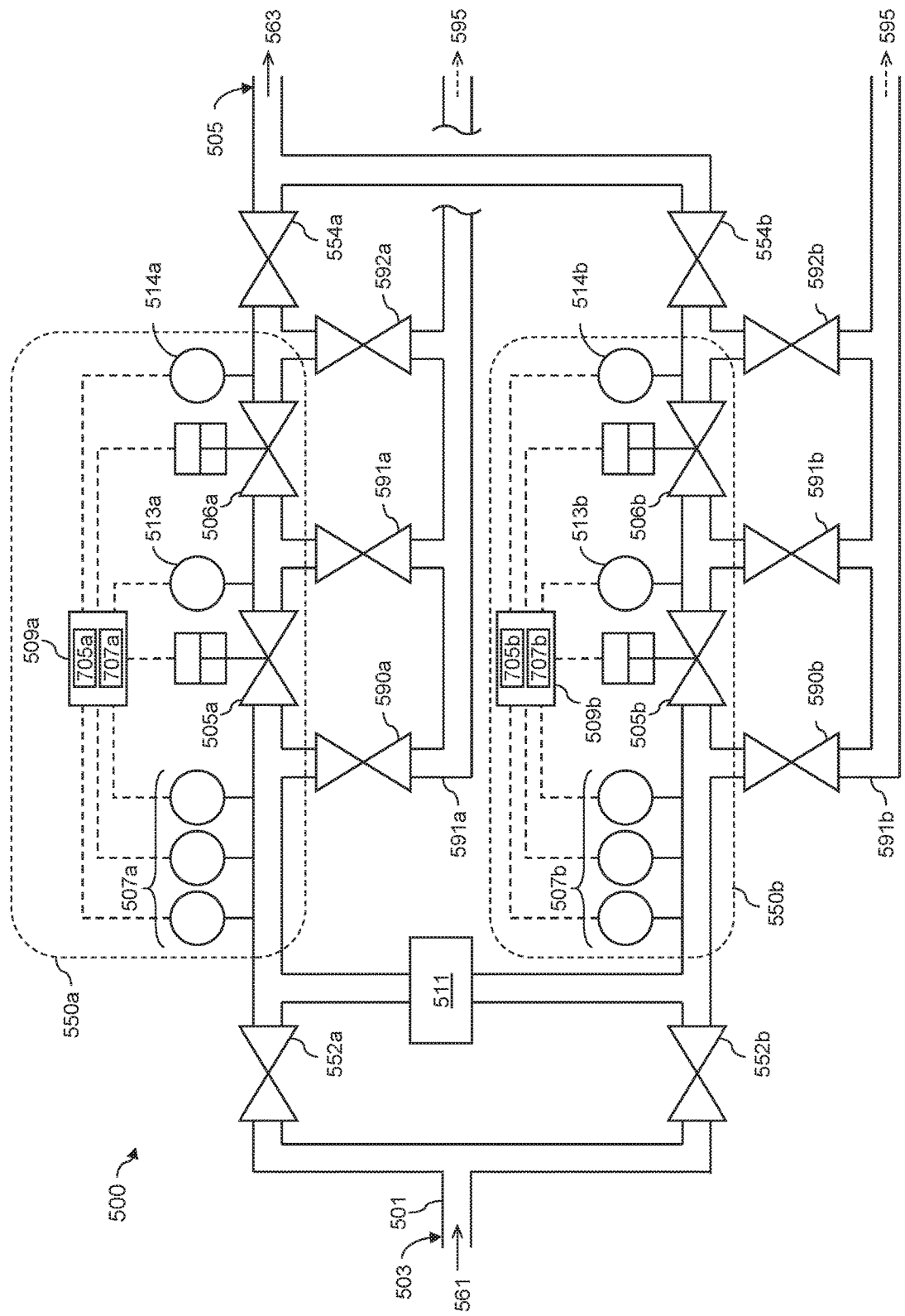
FIG. 5 is an example of a HIPS with two subsystems in a parallel configuration.

Referring to FIG. 5, a HIPS 500 can have two subsystems (550a, 550b) in parallel fluid flow in relation to each other. Similar to the HIPS 100 shown in FIG. 1, the HIPS 500 includes a flow line 501 that includes an inlet 503 and an outlet 505. The inlet 503 can be connected to a first source of pressure 561 (for example, a hydrocarbon-carrying pipeline), and the outlet 505 can be connected to a downstream system 563, which can withstand pressure up to a predetermined pressure threshold value (such as the design pressure of the downstream system 563). The first subsystem 550a and the subsystem 550b are installed on the flow line 501 between the inlet 503 and the outlet 505. The second subsystem 550b is in a parallel flow configuration in relation to the first subsystem 550a. The first subsystem 550a is configured to protect the downstream system 563 by isolating the flow line 501 from the downstream system 563 when pressure within the first subsystem 550a is equal to or greater than the predetermined pressure threshold value. The second subsystem 550b is configured to protect the downstream system 563 by isolating the flow line 501 from the downstream system 563 when pressure within the second subsystem 550b is equal to or greater than the predetermined pressure threshold value. This parallel configuration of the subsystems 550a and 550b can allow fluid to continue to flow from the first source of pressure 561 to the downstream system 563 through one of the subsystems (550a or 550b) even while the other subsystem (550b or 550a, respectively) is being safety tested. In cases where the first source of pressure 561 is a hydrocarbon-carrying pipeline, for example, from a wellhead, hydrocarbon production can continue without interruption or downtime while the HIPS 500 is being safety tested. After one of the subsystems (550a or 550b) is safety tested, the fluid can then be directed through that subsystem, while the other subsystem (550b or 550a, respectively) undergoes safety testing. This parallel configuration also allows for maintenance, repairs, and inspections to be completed on the components (for example, the first SSV 505a or the pressure sensors 507a) without production interruption. In some cases, both subsystems (550a and 550b) can operate simultaneously.

The first subsystem 550a can include a first SSV 505a, a second SSV 506a, multiple pressure sensors 507a, and a first logic solving processor 509a. The second SSV 506a can be installed downstream of the first SSV 505a, and the pressure sensors 507a can be installed upstream of the first SSV 505a. In some cases, the pressure sensors 507a can be installed downstream of the second SSV 506a. The first logic solving processor 509a can be in communication with the pressure sensors 507a, the first SSV 505a, and the second SSV 506a. The first logic solving processor 509a can be configured to perform operations including transmitting signals to control the first SSV 505a and the second SSV 506a based on signals received from the pressure sensors 507a. The first logic solving processor 509a can be substantially the same as the logic solving processor 109 shown in FIG. 1.

The second subsystem 550b can include a third SSV 505b, a fourth SSV 506b, multiple pressure sensors 507b, and a second logic solving processor 509b. The fourth SSV 506b can be installed downstream of the third SSV 505b, and the pressure sensors 507b can be installed upstream of the third SSV 505b. In some cases, the pressure sensors 507b can be installed downstream of the fourth SSV 506b. The second logic solving processor 509b can be in communication with the pressure sensors 507b, the third SSV 505b, and the fourth SSV 506b. The second logic solving processor 509b can be configured to perform operations including transmitting signals to control the third SSV 505b and the fourth SSV 506b based on signals received from the pressure sensors 507b. The second logic solving processor 509b can be substantially the same as the logic solving processor 109 shown in FIG. 1. The logic solving processors (507a, 507b) are configured to operate independently of each other.

The HIPS 500 includes a second source of pressure 511 which can be fluidically connected to the first subsystem 550a and the second subsystem 550b. For example, the second source of pressure 511 can be connected to the flow line 501 downstream of the inlet 503 and upstream of the first SSV 505a and the third SSV 505b. While the first source of pressure 561 provides fluidic pressure to the first subsystem 550a, the second subsystem 550b is configured to be isolated from the flow line 501 and the first subsystem 550a. In this configuration, the second source of pressure 511 can provide fluidic pressure to the second subsystem 550b to test a fluidic integrity of the second subsystem 550b. During testing of the fluidic integrity of the second subsystem 550b, the second source of pressure 511 can be isolated from the first subsystem 550a. While the first source of pressure 561 provides fluidic pressure to the second subsystem 550b, the first subsystem 550a is configured to be isolated from the flow line 501 and the second subsystem 550b. In this configuration, the second source of pressure 511 can provide fluidic pressure to the first subsystem 550a to test a fluidic integrity of the first subsystem 550a. During testing of the fluidic integrity of the first subsystem 550a, the second source of pressure 511 can be isolated from the second subsystem 550b. Similar to the HIPS 100 shown in FIG. 1, the second source of pressure 511 allows for actual rather than simulated testing.

Similar to the second source of pressure 111 of the HIPS 100 shown in FIG. 1, the second source of pressure 511 can be connected to the flow line 501 with piping or temporary tubing. Although shown in FIG. 5 as being connected to both subsystems (550a, 550b), the second source of pressure 511 can optionally be connected to only one of the subsystems (550a or 550b) at a time. In some implementations, the HIPS 500 includes two secondary sources of pressure (not shown), in which one of the secondary sources of pressure is designated for and connected to the first subsystem 550a and the other secondary source of pressure is designated for and connected to the second subsystem 550b. The components of subsystems 550a and 550b can be substantially the same as the corresponding components of the HIPS 100 shown in FIG. 1. For the purpose of clarity, the components of the first subsystem 550a are described here, and the descriptions can be applied to the corresponding components of the second subsystem 550*b* (that is, the description of corresponding components in subsystem 550*a* and 550*b* are the same, unless described otherwise).

Under normal operation, the first source of pressure 561 sends fluid through the flow line 501 to the downstream system 563. The first source of pressure 561 can be, for example, a well. The well enables access to one or more subterranean zones to allow recovery (that is, production) of fluid to the surface. As another example, the first source of pressure 561 can be a pipeline carrying hydrocarbons across hundreds of miles. The fluid flowing through the flow line 501 can be a hydrocarbon gas, a hydrocarbon liquid, or a mixture of both. In some cases, the fluid flowing through the flow line 501 is another fluid, such as primarily water in vapor, liquid, or mixed phase.

The HIPS 500 can include isolation valves that can be closed such that the fluid from the first source of pressure 561 flows through only one of the subsystems (550*a* or 550*b*), while the other subsystem (550*b* or 550*a*, respectively) is isolated. For example, the HIPS 500 can include an isolation valve 552*a* upstream of the first SSV 505*a* and an isolation valve 554*a* downstream of the second SSV 506*a*. By closing the isolation valves 552*a* and 554*a*, the set 550*a* can be isolated from the flow line 501, the first source of pressure 561, the downstream system 563, and the second subsystem 550*b*. While isolated, the fluidic integrity of the first subsystem 550*a* can be tested. Because the subsystems 550*a* and 550*b* are in parallel fluid flow in relation to each other, fluid can continue to flow from the first source of pressure 561 to the downstream system 563 through whichever subsystem (550*a* or 550*b*) is not isolated. The isolated subsystem (for example, the first subsystem 550*a*) can be connected to the second source of pressure 511 and be safety tested. With the parallel configuration of the subsystems 550*a* and 550*b*, the first source of pressure 561 does not need to be taken offline while the HIPS 500 is being safety tested. As an example, if the first source of pressure 561 is a wellhead pipeline, production from the well does not need to be paused while the HIPS 500 is being tested, maintained, or repaired.

The subsystems 550*a* and 550*b* can also include components substantially similar or identical to those of the HIPS 100 shown in FIG. 1. For example, the HIPS 500 can include discharge valves (590*a*, 591*a*, 592*a*) for the first subsystem 550*a*) upstream of the first SSV 505*a*, between the first SSV 505*a* and the second SSV 506*a*, and downstream of the second SSV 506*a*, respectively. Under normal operation, these discharge valves 590*a*, 591*a*, and 592*a* are closed. The discharge valves 590*a*, 591*a*, and 592*a* can be opened to purge, drain, vent, or clear piping between respective components (for example, between the first SSV 505*a* and the second SSV 506*a*). The discharge valves 590*a*, 591*a*, and 592*a* can share a common discharge manifold 591*a* (as shown in FIG. 5) or can each have separate discharge piping to send fluid to another downstream system 595 (for example, a disposal system, flare, burn pit, or recirculation system). Although FIG. 5 shows the subsystems 550*a* and 550*b* having separate discharge manifolds (591*a* and 591*b*, respectively) for sending fluid to the downstream system 595, in some implementations, the subsystems 550*a* and 550*b* can share a common discharge manifold that then conducts fluid to the downstream system 595. In some implementations, the subsystems 550*a* and 550*b* discharge to different downstream systems (for example, the first subsystem 550*a* discharges to a disposal system, while the second subsystem 550*b* discharges to a recirculation system). All valves (including the first SSV 505*a* and the second SSV 506*a*) can be operated by conventional hydraulically or electrically-powered valve actuators (not shown), such as those that are well known in the art. The discharge valves 590*a*, 591*a*, and 592*a* can be controlled automatically (for example, with the first logic solving processor 509*a* or a control system) or manually (for example, by an operator).

FIG. 6 shows a flow chart illustrating a method 600 for safety testing of a HIPS. As an example, the HIPS can be the HIPS 500 shown in FIG. 5 for the flow line 501, which includes the first subsystem 550*a* and the second subsystem 550*b* in a parallel configuration in relation to each other. At 601, fluidic pressure is provided in the flow line 501 by the first source of pressure 561.

At 603, fluid flow is directed from the first source of pressure 561 through the first subsystem 550*a*. The following steps (605*a*, 605*b*, 605*c*, 605*d*) occur while fluid flow is directed through the first subsystem 550*a* at 603. At 605*a*, the second subsystem 550*b* is isolated from the first source of pressure 561 and the first subsystem 550*a*. At 605*b*, fluidic pressure is provided in the second subsystem 550*b* by the second source of pressure 511 to at least a predetermined pressure threshold value (for example, the design pressure of the downstream system 563). At 605*c*, a stroke test is conducted on the second subsystem 550*b*. At 605*d*, a leak test is conducted on the second subsystem 550*b*.

The steps 603, 605*a*, 605*b*, 605*c*, and 605*d* can be repeated, but applied to the other subsystem. In other words, fluid flow can be directed from the first source of pressure 561 through the second subsystem 550*b*. While fluid flow is directed through the second subsystem 550*b*, the first subsystem 550*a* can be isolated from the first source of pressure 561 and the second subsystem 550*b*. Fluidic pressure can be provided in the first subsystem 550*a* by the second source of pressure 511 to at least the predetermined threshold value. A stroke test and a leak test can be conducted on the first subsystem 550*a*.

The stroke test can be substantially the same as the stroke test described in method 300. Conducting the stroke test on the first subsystem 550*a* at 605*c* can include transmitting a first close signal to close the first SSV 505*a* and the second SSV 506*a* based on detecting pressure in the first subsystem 550*a* equal to or greater than the predetermined pressure threshold value. The stroke test on the first subsystem 550*a* can include actuating a first close failure alarm based on determining that any one of the first SSV 505*a* and the second SSV 506*a* failed to close upon transmission of the first close signal. Conducting the stroke test on the second subsystem 550*b* can include transmitting a second close signal to close the third SSV 505*b* and the fourth SSV 506*b* based on detecting pressure in the second subsystem 550*b* equal to or greater than the predetermined pressure threshold value. The stroke test on the second subsystem 550*b* can include actuating a second close failure alarm based on determining that any one of the third SSV 505*b* and the fourth SSV 506*b* failed to close upon transmission of the second close signal.

The leak test can be substantially the same as the leak test described in method 300. Conducting the leak test on the first subsystem 550*a* at 605*d* can include detecting, by a first leak sensor (such as the leak sensor 513*a*) installed directly downstream of the first SSV 505*a*, a first change in fluidic pressure directly downstream of the first SSV 505*a*. The leak test on the first subsystem 550*a* can include detecting, by a second leak sensor (such as the leak sensor 514*a*) installed directly downstream of the second SSV 506*a*, a second change in fluidic pressure directly downstream of the second SSV 506*a*. The first logic solving processor 509*a* can compare the first change in fluidic pressure and the second change in fluidic pressure to a predetermined pressure differential threshold value (such as the predetermined pressure differential threshold value described in method 300). The leak test on the first subsystem 550*a* can include actuating a first leak failure alarm if the first change in fluidic pressure is greater than the predetermined pressure differential threshold value within a predetermined time span after the transmission of the first close signal (605*c*). The leak test on the first subsystem 550*a* can include actuating a second leak failure alarm if the second change in fluidic pressure is greater than the predetermined pressure differential threshold value within the predetermined time span after the transmission of the first close signal (605*c*).

Conducting the leak test on the second subsystem 550*b* can include detecting, by a third leak sensor (such as the leak sensor 513*b*) installed directly downstream of the third SSV 505*b*, a third change in fluidic pressure directly downstream of the third SSV 505*b*. The leak test on the second subsystem 550*b* can include detecting, by a fourth leak sensor (such as the leak sensor 514*b*) installed directly downstream of the fourth SSV 506*b*, a fourth change in fluidic pressure directly downstream of the fourth SSV 506*b*. The second logic solving processor 509*b* can compare the third change in fluidic pressure and the fourth change in fluidic pressure to the predetermined pressure differential threshold value. The leak test on the second subsystem 550*b* can include actuating a third leak failure alarm if the third change in fluidic pressure is greater than the predetermined pressure differential threshold value within the predetermined time span after the transmission of the second close signal (from the stroke test on the second subsystem 550*b*). The leak test on the second subsystem 550*b* can include actuating a fourth leak failure alarm if the fourth change in fluidic pressure is greater than the predetermined pressure differential threshold value within the predetermined time span after the transmission of the second close signal.

Figure 7A:
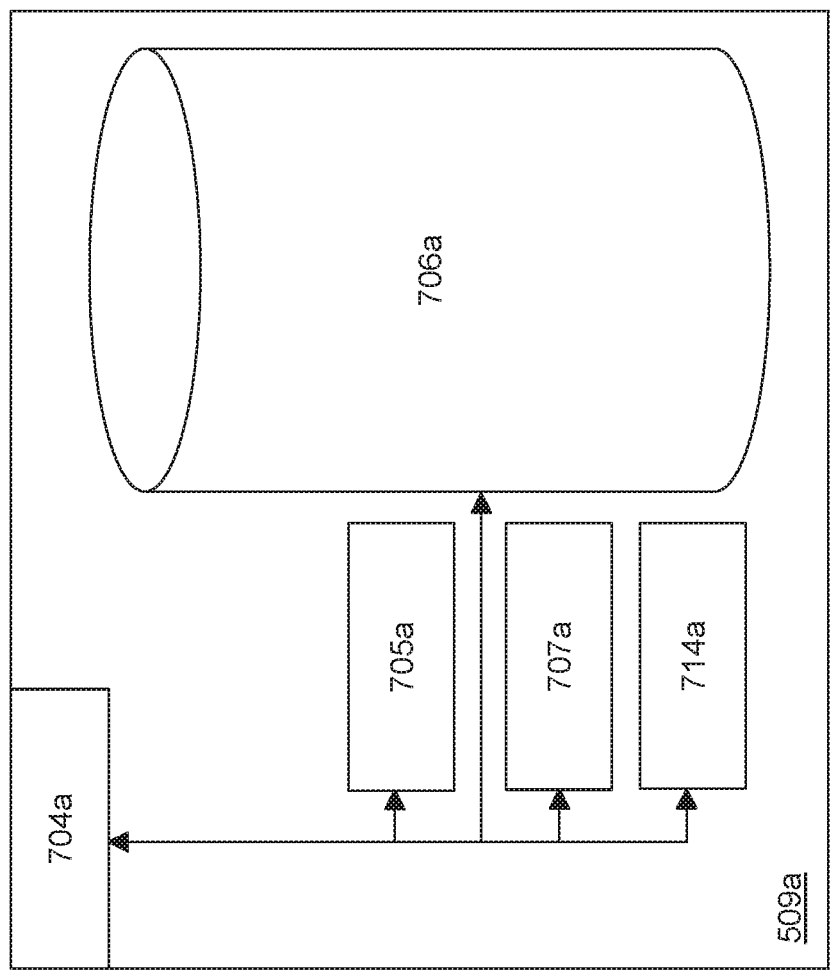
FIGS. 7A and 7B are block diagrams of example logic solving processors of the HIPS of FIG. 5.

FIG. 7A is a block diagram of an example logic solving processor 509*a* (also shown in FIG. 5) used to provide computational functionalities associated with described algorithms, methods, functions, processes, flows, and procedures, as described in this specification, according to an implementation. The illustrated first logic solving processor 509*a* is intended to encompass any computing device such as a server, desktop computer, laptop/notebook computer, one or more processors within these devices, or any other suitable processing device, including physical or virtual instances (or both) of the computing device. Additionally, the first logic solving processor 509*a* can include (or communicate with) a computer that includes an input device, such as a keypad, keyboard, touch screen, or other device that can accept user information, and an output device that conveys information associated with the operation of the first logic solving processor 509*a*, including digital data, visual, audio information, or a combination of information.

The first logic solving processor 509*a* includes a processor 705*a*. Although illustrated as a single processor 705*a* in FIG. 7A, two or more processors may be used according to particular needs, desires, or particular implementations of the first logic solving processor 509*a*. Generally, the processor 705*a* executes instructions and manipulates data to perform the operations of the first logic solving processor 509*a* and any algorithms, methods, functions, processes, flows, and procedures as described in this specification.

The first logic solving processor 509*a* can also include a database 706*a* that can hold data for the first logic solving processor 509*a* or other components (or a combination of both) that can be connected to the network. Although illustrated as a single database 706*a* in FIG. 7A, two or more databases (of the same or combination of types) can be used according to particular needs, desires, or particular implementations of the first logic solving processor 509*a* and the described functionality. While database 706*a* is illustrated as an integral component of the first logic solving processor 509*a*, in alternative implementations, database 706*a* can be external to the first logic solving processor 509*a*. The database 706*a* can include various parameters, such as the predetermined pressure threshold value, the predetermined pressure differential threshold value, and the predetermined time span.

The first logic solving processor 509*a* can include an interface 704*a*. Although illustrated as a single interface 704*a* in FIG. 7A, two or more interfaces 704*a* may be used according to particular needs, desires, or particular implementations of the first logic solving processor 509*a*. The interface 704*a* is used by the first logic solving processor 509*a* for communicating with other systems that are connected to the network in a distributed environment. Generally, the interface 704*a* comprises logic encoded in software or hardware (or a combination of software and hardware) and is operable to communicate with the network. More specifically, the interface 704*a* may comprise software supporting one or more communication protocols associated with communications such that the network or interface's hardware is operable to communicate physical signals within and outside of the illustrated first logic solving processor 509*a*.

The first logic solving processor 509*a* also includes a storage medium 707*a* (also referred as the memory) that can hold data for the first logic solving processor 509*a* or other components (or a combination of both) that can be connected to the network. The memory 707*a* can be transitory or non-transitory. Although illustrated as a single memory 707*a* in FIG. 7A, two or more memories 707*a* (of the same or combination of types) can be used according to particular needs, desires, or particular implementations of the first logic solving processor 509*a* and the described functionality. While memory 707*a* is illustrated as an integral component of the first logic solving processor 509*a*, in alternative implementations, memory 707*a* can be external to the first logic solving processor 509*a*. The memory 707*a* stores computer-readable instructions executable by the processor 705*a* that, when executed, cause the one or more processors 705*a* to perform operations including transmitting signals to control valves, such as the first SSV 505*a* and the second SSV 506*a* shown in FIG. 5. Data can be obtained and stored (for example, during the stroke test 605*c* and the leak test 605*d* of method 600) in the memory 707*a*. The data obtained can optionally be graphically represented, for example, using the interface 704*a*.

The first logic solving processor 509*a* can also include a power supply 714*a*. The power supply 714*a* can include a rechargeable or non-rechargeable battery that can be configured to be either user- or non-user-replaceable. The power supply 714*a* can be hard-wired. There may be any number of first logic solving processors 509*a* associated with, or external to, a computer system containing the first logic solving processor 509*a*, each logic solving processor 509*a* communicating over the network. Moreover, this specification contemplates that many users may use one logic solving processor 509*a*, or that one user may use multiple logic solving processors 509*a*.

Figure 7B:
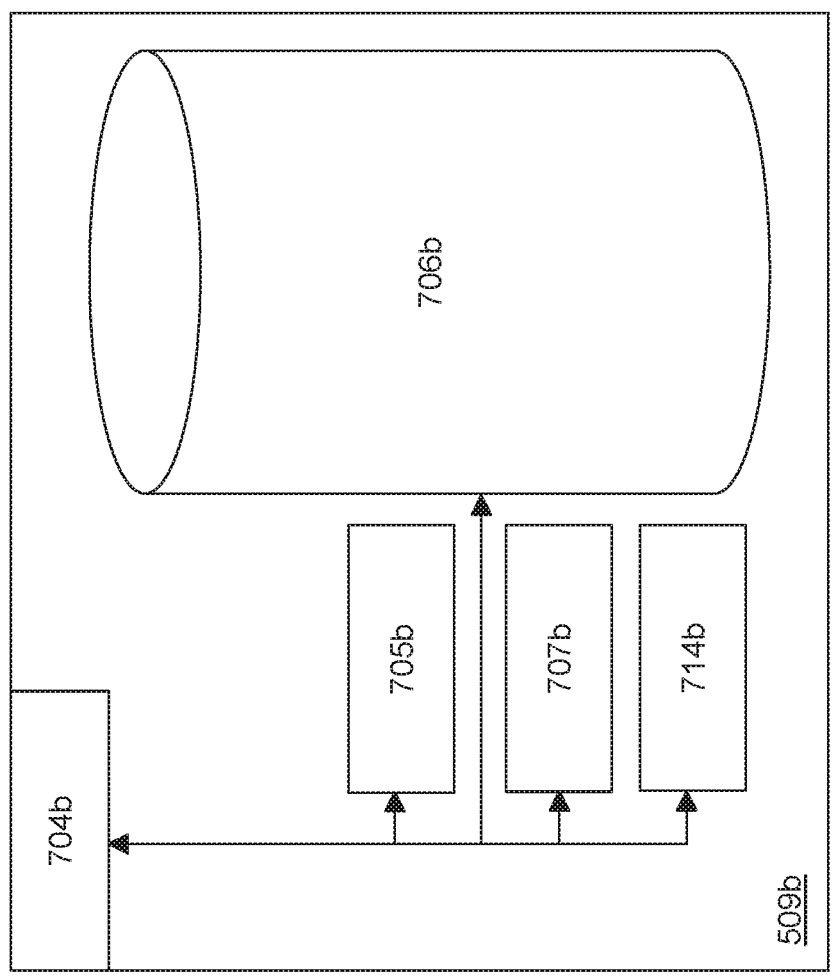

FIG. 7B is a block diagram of an example logic solving processor 509*b* (also shown in FIG. 5) used to provide computational functionalities associated with described algorithms, methods, functions, processes, flows, and procedures, as described in this specification, according to an implementation. The illustrated second logic solving processor 509b is intended to encompass any computing device such as a server, desktop computer, laptop/notebook computer, one or more processors within these devices, or any other suitable processing device, including physical or virtual instances (or both) of the computing device. Additionally, the second logic solving processor 509b can include (or communicate with) a computer that includes an input device, such as a keypad, keyboard, touch screen, or other device that can accept user information, and an output device that conveys information associated with the operation of the second logic solving processor 509b, including digital data, visual, audio information, or a combination of information.

The second logic solving processor 509b includes a processor 705b. Although illustrated as a single processor 705b in FIG. 7B, two or more processors may be used according to particular needs, desires, or particular implementations of the second logic solving processor 509b. Generally, the processor 705b executes instructions and manipulates data to perform the operations of the second logic solving processor 509b and any algorithms, methods, functions, processes, flows, and procedures as described in this specification.

The second logic solving processor 509b can also include a database 706b that can hold data for the second logic solving processor 509b or other components (or a combination of both) that can be connected to the network. Although illustrated as a single database 706b in FIG. 7B, two or more databases (of the same or combination of types) can be used according to particular needs, desires, or particular implementations of the second logic solving processor 509b and the described functionality. While database 706b is illustrated as an integral component of the second logic solving processor 509b, in alternative implementations, database 706a can be external to the second logic solving processor 509b. The database 706b can include various parameters, such as the predetermined pressure threshold value, the predetermined pressure differential threshold value, and the predetermined time span.

The second logic solving processor 509b can include an interface 704b. Although illustrated as a single interface 704b in FIG. 7B, two or more interfaces 704b may be used according to particular needs, desires, or particular implementations of the second logic solving processor 509b. The interface 704b is used by the second logic solving processor 509b for communicating with other systems that are connected to the network in a distributed environment. Generally, the interface 704b comprises logic encoded in software or hardware (or a combination of software and hardware) and is operable to communicate with the network. More specifically, the interface 704b may comprise software supporting one or more communication protocols associated with communications such that the network or interface's hardware is operable to communicate physical signals within and outside of the illustrated first logic solving processor 509a.

The second logic solving processor 509b also includes a storage medium 707b (also referred as the memory) that can hold data for the second logic solving processor 509b or other components (or a combination of both) that can be connected to the network. The memory 707b can be transitory or non-transitory. Although illustrated as a single memory 707b in FIG. 7B, two or more memories 707b (of the same or combination of types) can be used according to particular needs, desires, or particular implementations of the second logic solving processor 509b and the described functionality. While memory 707b is illustrated as an integral component of the second logic solving processor 509b, in alternative implementations, memory 707b can be external to the second logic solving processor 509b. The memory 707b stores computer-readable instructions executable by the processor 705b that, when executed, cause the one or more processors 705b to perform operations including transmitting signals to control valves, such as the third SSV 505b and the fourth SSV 506b shown in FIG. 5. Data can be obtained and stored (for example, during the stroke test and the leak test on the second subsystem 550b) in the memory 707b. The data obtained can optionally be graphically represented, for example, using the interface 704b.

The second logic solving processor 509b can also include a power supply 714b. The power supply 714b can include a rechargeable or non-rechargeable battery that can be configured to be either user- or non-user-replaceable. The power supply 714b can be hard-wired. There may be any number of second logic solving processors 509b associated with, or external to, a computer system containing the second logic solving processor 509b, each logic solving processor 509b communicating over the network. Moreover, this specification contemplates that many users may use one logic solving processor 509b, or that one user may use multiple logic solving processors 509b.

While this specification contains many specific implementation details, these should not be construed as limitations on the scope of the subject matter or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:
1. A high integrity protection system (HIPS) comprising:
   a flow line comprising:
      an inlet configured to be connected to a first source of pressure; and an outlet configured to be connected to a downstream system configured to withstand pressure up to a predetermined pressure threshold value;

a first subsystem installed on the flow line between the inlet and the outlet, the first subsystem configured to protect the downstream system by isolating the flow line from the downstream system when pressure within the first subsystem is equal to or greater than the predetermined pressure threshold value;

a second subsystem installed on the flow line between the inlet and the outlet, the second subsystem in a parallel flow configuration in relation to the first subsystem, the second subsystem configured to protect the downstream system by isolating the flow line from the downstream system when pressure within the second subsystem is equal to or greater than the predetermined pressure threshold value; and a second source of pressure configured to be fluidically connected to the first subsystem and the second subsystem, wherein:

while the first source of pressure provides fluidic pressure to the first subsystem, the second subsystem is configured to be isolated from the flow line and the first subsystem, the second source of pressure is configured to provide fluidic pressure to the second subsystem to test a fluidic integrity of the second subsystem, and the second source of pressure is configured to be isolated from the first subsystem; and while the first source of pressure provides fluidic pressure to the second subsystem, the first subsystem is configured to be isolated from the flow line and the second subsystem, the second source of pressure is configured to provide fluidic pressure to the first subsystem to test a fluidic integrity of the first subsystem, and the second source of pressure is configured to be isolated from the second subsystem.

2. The system of claim 1, wherein the first subsystem comprises:
a first surface safety valve (SSV);
a second SSV installed downstream of the first SSV;
a plurality of pressure sensors installed upstream of the first SSV; and
a logic solving processor in communication with the plurality of pressure sensors, the first SSV, and the second SSV, the logic solving processor configured to perform operations comprising transmitting signals to control the first SSV and the second SSV based on signals received from the plurality of pressure sensors.

3. The system of claim 2, wherein the plurality of pressure sensors is a first plurality of pressure sensors, the logic solving processor is a first logic solving processor, and the second subsystem comprises:
a third SSV;
a fourth SSV installed downstream of the third SSV;
a second plurality of pressure sensors installed upstream of the third SSV; and
a second logic solving processor in communication with the second plurality of pressure sensors, the third SSV, and the fourth SSV, the second logic solving processor configured to perform operations comprising transmitting signals to control the third SSV and the fourth SSV based on signals received from the second plurality of pressure sensors.

4. The system of claim 3, wherein the first source of pressure comprises a hydrocarbon-carrying pipeline.

5. The system of claim 3, wherein the second source of pressure comprises a pump or a compressor, and the second source of pressure is configured to provide fluidic pressure in the flow line to at least the predetermined pressure threshold value.

6. The system of claim 5, wherein the first logic solving processor is configured to perform operations comprising, while the second source of pressure provides fluidic pressure to the first subsystem:
executing a stroke test on the first SSV and the second SSV; and
executing a leak test on the first SSV and the second SSV.

7. The system of claim 6, wherein the second logic solving processor is configured to perform operations comprising, while the second source of pressure provides fluidic pressure to the second subsystem:
executing a stroke test on the third SSV and the fourth SSV; and
executing a leak test on the third SSV and the fourth SSV.

8. The system of claim 7, wherein the first subsystem comprises:
a first leak sensor installed between the first SSV and the second SSV; and
a second leak sensor installed downstream of the second SSV, the first logic solving processor in communication with the first leak sensor and the second leak sensor, the first logic solving processor configured to perform operations comprising transmitting a first leak failure signal based on determining a presence of a leak past any one of the first SSV and the second SSV, while the first SSV and the second SSV are closed.

9. The system of claim 8, wherein the second subsystem comprises:
a third leak sensor installed between the third SSV and the fourth SSV; and
a fourth leak sensor installed downstream of the fourth SSV, the second logic solving processor in communication with the third leak sensor and the fourth leak sensor, the second logic solving processor configured to perform operations comprising transmitting a second leak failure signal based on determining a presence of a leak past any one of the third SSV and the fourth SSV, while the third SSV and the fourth SSV are closed.

10. The system of claim 9, wherein the first logic solving processor comprises:
a hardware processor; and
a computer-readable storage medium coupled to the hardware processor and storing programming instructions for execution by the hardware processor, wherein the programming instructions, when executed, cause the hardware processor to perform operations comprising:
transmitting a close signal to close the first SSV and the second SSV based on determining any two of the first plurality of pressure sensors senses in the flow line a pressure equal to or greater than the predetermined pressure threshold value; and
transmitting a closure failure signal based on determining that any one of the first SSV and the second SSV failed to close upon transmission of the close signal.

11. The system of claim 10, wherein the hardware processor is a first hardware processor, the computer-readable storage medium is a first computer-readable storage medium, the close signal is a first close signal, the closure failure signal is a first closure failure signal, and the second logic solving processor comprises:
a second hardware processor; and
a second computer-readable storage medium coupled to the second hardware processor and storing programming instructions for execution by the second hardware processor, wherein the programming instructions, when executed, cause the second hardware processor to perform operations comprising:
  transmitting a second close signal to close the third SSV and the fourth SSV based on determining any two of the second plurality of pressure sensors senses in the flow line a pressure equal to or greater than the predetermined pressure threshold value; and
  transmitting a second closure failure signal based on determining that any one of the third SSV and the fourth SSV failed to close upon transmission of the second close signal.

12. The system of claim 9, wherein the first leak sensor, the second leak sensor, the third leak sensor, and the fourth leak sensor are pressure sensors.

13. The system of claim 12, wherein:
  while the first SSV is closed, if an increase in fluidic pressure that is equal to or greater than a predetermined pressure differential threshold value is detected by the first leak sensor within a predetermined time span after closing of the first SSV, a presence of a leak past the first SSV is determined;
  while the second SSV is closed, if an increase in fluidic pressure that is equal to or greater than the predetermined pressure differential threshold value is detected by the second leak sensor within the predetermined time span after closing of the second SSV, a presence of a leak past the second SSV is determined;
  while the third SSV is closed, if an increase in fluidic pressure that is equal to or greater than the predetermined pressure differential threshold value is detected by the third leak sensor within the predetermined time span after closing of the third SSV, a presence of a leak past the third SSV is determined; and
  while the fourth SSV is closed, if an increase in fluidic pressure that is equal to or greater than the predetermined pressure differential threshold value is detected by the fourth leak sensor within the predetermined time span after closing of the fourth SSV, a presence of a leak past the fourth SSV is determined.

* * * * *